(12) United States Patent
Ding

(10) Patent No.: US 7,829,034 B2
(45) Date of Patent: Nov. 9, 2010

(54) CATALYTIC AIR PURIFICATION SYSTEM

(75) Inventor: Xiaoling Ding, St. Petersburg, FL (US)

(73) Assignee: University of South Florida, Tampa, FL (US)

( * ) Notice: Subject to any disclaimer, the term of this patent is extended or adjusted under 35 U.S.C. 154(b) by 1196 days.

(21) Appl. No.: 11/160,747

(22) Filed: Jul. 7, 2005

(65) Prior Publication Data

US 2007/0009414 A1    Jan. 11, 2007

Related U.S. Application Data

(63) Continuation of application No. PCT/US2004/000294, filed on Jan. 8, 2004.

(60) Provisional application No. 60/319,843, filed on Jan. 8, 2003.

(51) Int. Cl.
    *F01N 3/10* (2006.01)
(52) U.S. Cl. .................................... 422/173
(58) Field of Classification Search ........... 422/168, 422/173, 180; 423/210; 55/68, 73
    See application file for complete search history.

(56) References Cited

U.S. PATENT DOCUMENTS

| 3,957,464 A | 5/1976 | Teller |
| 5,308,810 A | 5/1994 | Voss et al. |
| 6,601,385 B2 * | 8/2003 | Verdegan et al. .............. 60/286 |

FOREIGN PATENT DOCUMENTS

GB        2450145 A   * 12/2008

\* cited by examiner

*Primary Examiner*—Tom Duong
(74) *Attorney, Agent, or Firm*—Thomas E. Toner; Smith & Hopen, P.A.

(57) ABSTRACT

The instant invention provides for a gas purification system in which a reaction chamber combines with catalysts and heating to oxidize and reduce the compounds contained in a gas stream to oxygen and other non-deleterious components. By use of this system closed loop air systems can be effectively supplied with oxygen by chemically converting the volatile organic components to desired gasses and thereby remove unwanted contaminants.

12 Claims, 3 Drawing Sheets

CATALYTIC AIR PURIFICATION SYSTEM

CROSS REFERENCE TO RELATED APPLICATIONS

This application is a continuation of International Patent Application No. PCT/US2004/000294, filed on Jan. 8, 2004, which claims the benefit of U.S. Provisional Patent Application Ser. No. 60/319,843 filed Jan. 8, 2003.

BACKGROUND OF THE INVENTION

Field of the Invention

This invention relates to the field of air cleaners and provides for an air recirculation system, which removes deleterious materials from the air.

In a closed space such as found in spacecraft, aircraft, and submarines, typically the confined air is recycled through a filtration system and recirculated back into the passenger cabins. Conventional filtration systems are incapable of removing many of the unwanted organic contaminants from the air and thus many deleterious compounds, such as viruses, are not removed from the recycled air. This results in the spread of diseases as well as other types of discomfort to the people within the confined spaces. Thus, it is desirable to maximize the removal of contaminants from the air. Conventional filtration has proven incapable of performing this task effectively.

SUMMARY OF THE INVENTION

The present invention provides an air purification system comprising a gas flow stream, and a reaction chamber comprising at least one oxidation catalyst portion and at least one reduction catalyst portion in fluid communication with the gas flow stream. The invention further provides an air purification system comprising a heating source in fluid communication with the gas flow stream, such that the gas flow stream is heated coincident with treatment by the reaction chamber. The invention further comprises an air purification system comprising a heat exchanger adapted to reclaim the heat supplied by the heating source to the gas flow stream.

In a preferred embodiment of the invention the heating source is integral with the reaction chamber. In yet another embodiment of the invention, the heating source is located externally from the reaction chamber such that heating occurs prior to the gas flow stream entering the reaction chamber. In an additional embodiment, the heat exchanger supplies the reclaimed heat as a pretreatment of the gas flow stream.

In yet another embodiment, the air purification system further comprises a post-treatment process for further treatment of the gas flow stream exiting the reaction chamber. The post-treatment process further comprises a carbon dioxide to oxygen converter and/or a water vapor isolation system.

In another embodiment, the reaction chamber comprises a plurality of catalyst portions, which may be of differing compositions.

In an additional embodiment, the gas flow stream is conveyed through a particle separating filter prior to contact with the heating source and the reaction chamber. The particle-separating filter may further comprise a vapor separator.

A preferred method of purification of a gas stream as taught by the present invention comprises the steps of containing a gas to form a flow stream, heating the contained gas flow stream to a pre-determined temperature, contacting the heated gas flow stream with a reduction catalyst to effect a reduction reaction, contacting the heated gas flow stream with an oxidation catalyst to effect an oxidation reaction, and reclaiming the heat from the gas flow stream.

In an additional preferred embodiment, the air purification method further includes using the reclaimed heat to heat the gas flow stream to the pre-determined temperature.

In yet another preferred method embodiment, the gas flow stream is subjected to a carbon dioxide conversion. Subjecting the gas flow stream to a carbon dioxide conversion can occur prior to the heat reclamation of after the heat reclamation.

Other aspects and advantages of the present invention can be seen upon review of the figures, the detailed description, and the claims, which follow.

DETAILED DESCRIPTION OF THE PREFERRED EMBODIMENT

Figure 1:
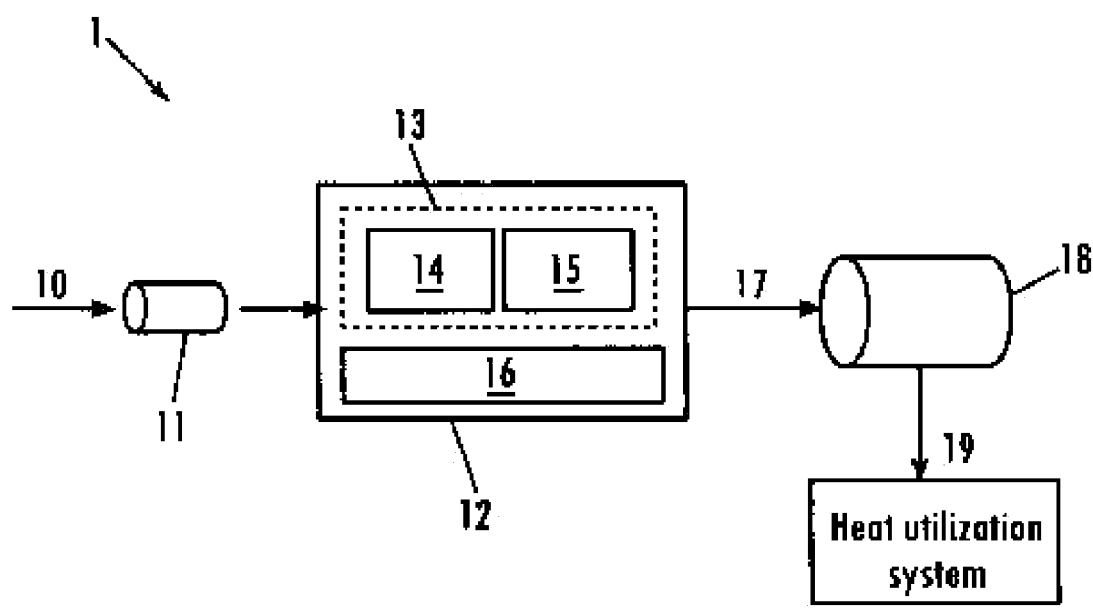
FIG. 1 is a diagrammatic representation of an illustrative embodiment of the invention.

The system of the present invention can function by using a gas flow stream which is created by containing the gas to be treated. The gas flow stream then flows into a reaction chamber in fluid communication with the gas flow stream which further comprises at least one oxidation catalyst portion and at least one reduction catalyst portion. The system of the present invention further comprises a heating source in thermal communication with the gas flow stream such that the gas flow stream is heated coincidently with treatment by the reaction chamber. The present system also comprises a heat exchanger adapted to transfer heat supplied by the heating source to the gas flow stream and a means for post-treating the gas flow stream exiting the reaction chamber. The present system can be configured such that the gas flow stream passes through conduits or pumps.

The present invention can also function by having the heating source located within the reaction chamber itself, or upstream from the reaction chamber while in fluid communication. The heat exchanger of the present invention can transfer heat to the gas flow stream upstream of the reaction chamber. Moreover, the present invention can be comprised of a gas flow stream converter in downstream fluid communication with the reaction chamber where that post-treatment is the conversion of carbon dioxide into oxygen and/or isolating the water vapor from the gas flow stream exiting the reaction chamber. The present invention can also be comprised of a gas flow stream converter in downstream or upstream fluid communication with the reaction chamber wherein the converter is a volatile organic carbon analyzer. This analyzer is useful in monitoring the gas flow stream for quality of air purification performed in accordance with the present invention.

The present invention can also function wherein the post-treatment of the gas flow stream comprises a heat exchanger to transfer the heat supplied by the heating source to the gas flow stream and transfer heat to the gas flow stream prior to introduction to the post-treatment process.

The reaction chamber of the present invention can house a plurality of catalyst portions. It is also possible that the plurality of catalyst portions comprise catalyst portions of different compositions. For example, the oxidation catalyst portion can be selected from platinum-based systems. Likewise, the reduction catalyst portion can be selected from titanium or vanadium systems. Moreover, before the gas flow stream enters the reaction chamber or heating source the present invention can be configured such that the gas flow stream passes through a particle separating filter. Furthermore, the particle separating filter can be comprised of a vapor separator.

The present invention is also drawn to a method for purifying a gas stream comprising containing a gas to form a flow stream, heating the contained gas flow stream to a pre-determined temperature, contacting the heated gas flow stream with a reduction catalyst to effect a reduction reaction while in a reaction chamber, contacting the heated gas flow stream with an oxidation catalyst to effect an oxidation reaction while in the reaction chamber, reclaiming the heat from the gas flow stream, and post-treating the gas flow stream after the gas flow stream exits the reaction chamber.

This method can use the reclaimed heat to heat the gas flow stream to the pre-determined temperature. The post-treating of the gas flow stream of the present invention can comprise converting carbon dioxide to oxygen and/or vapor isolation. This post-treatment can occur prior to or after the heat reclamation step. It is also possible that the heat reclaimed from this method is bled off and not reused in this method. It is further possible that the gas flow stream is passed through a particle separating filter prior to contact with the heating source or reaction chamber. Moreover, the particle separating filter of this method can comprise a vapor separator. Also, the present method can have a volatile organic carbon analyzer in either upstream or downstream fluid communication with the reaction chamber. This analyzer allows for useful monitoring of the gas flow stream for quality of the air purification performed in accordance with the present invention.

Referring to FIG. 1, the integrated air purification system 1 comprises an air or gas flow stream 10, which is contained in any conventional containment means, such as a pipe or other conduit, as known to one of ordinary skill in the art. Any suitable air pressure/pumping means, such as a pump, (not shown) can be used to force the gas stream 10 through the system 1. Air stream 10 is conveyed via this containment means into particulate filter 11 for removal of any large non-gaseous solid components. In a preferred embodiment, this filter 11 may be comprised of activated carbon or other suitable material as known to those of skill in the art. Other forms of physical separation means that trap solid particulate matter are within the scope of this invention. In a further embodiment of the invention, this filter means may also comprise a wet-absorber for liquid vapors as well as a molecular sieve for particulates.

Figure 2:
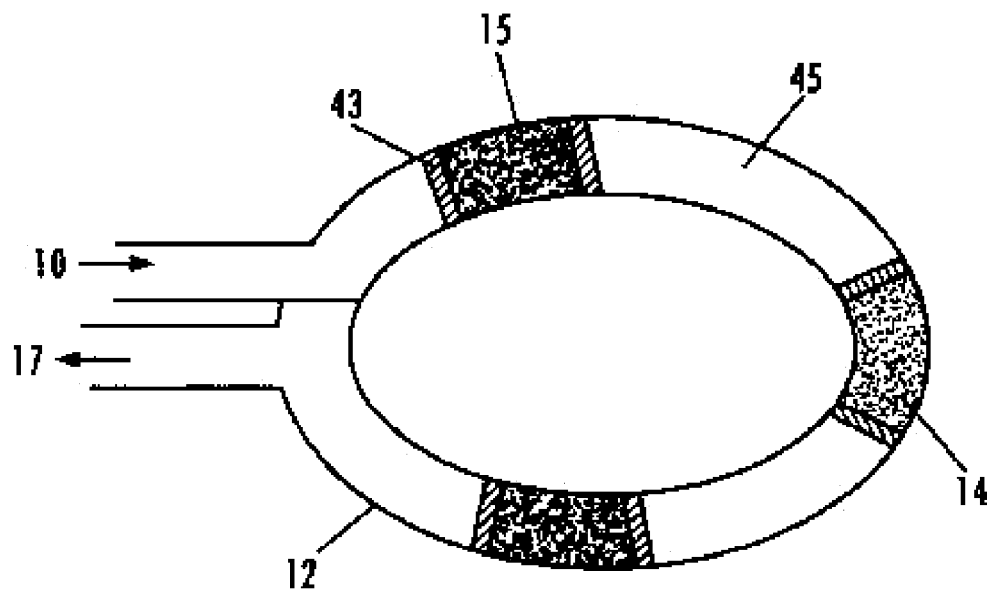
FIG. 2 is a diagrammatic representation of the novel reaction chamber.
Figure 3:
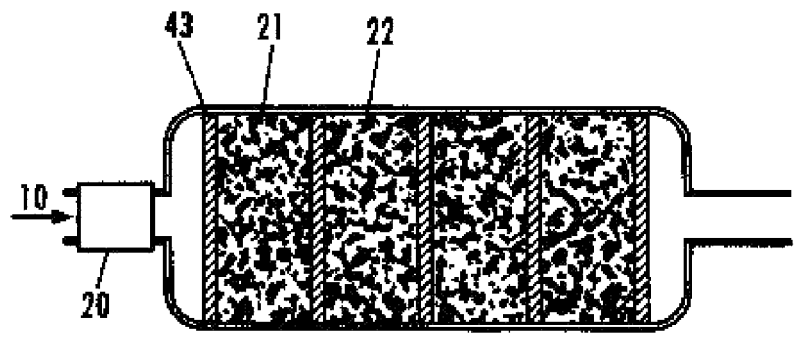
FIG. 3 is a diagrammatic representation of a second embodiment of the novel reaction chamber.

The gas stream 10 is then conveyed into the catalytic reaction chamber 12. The gas flow stream is conveyed throughout the system of the present invention in means know to one of ordinary skill in the art; for example, conduits, tubing, pumps, valve systems, and regulators. As shown in FIG. 1, the catalytic reaction chamber 12 comprises a catalytic portion 13 and a heating means 16. The catalytic portion 13 further comprises a high-temperature reduction portion 14 and a high-temperature oxidation portion 15, also depicted in FIG. 2. In FIG. 2, the catalytic reaction chamber is depicted as being semi-circular but a plurality of other geometric configurations may be employed as dictated by space and design concerns. The high-temperature reduction portion 14 and the high-temperature oxidation portion 15 may be single or multiple in nature as well as the catalysts themselves may be single chemical species or a plurality of differing oxidation and reduction catalysts. In addition, gas-permeable membranes 43 or other suitable means may be used as catalyst confining means within the chamber. The catalyst sections may be continuous as shown in FIG. 3 or be separated by voids 45 as shown in FIG. 2. A heating means 16 is integral to the reduction and oxidation portions 14 and 15. The air stream is heated and then contacted by the catalyst bed 13. The heating means may be located in the center of the bed structures, above or below them or in any desired geometry as well. In operation, the heating means serves to heat the gas stream at the same time the catalyst beds are interacting with the stream, thus making the energy consumption of the system more efficient. This differs from past systems in that heating is effected in the prior art prior to contact with the catalyst. Since less heat is required to perform the reduction portion of the reaction, this generally occurs first with additional heat being applied to the air stream during the reduction phase, which elevates the temperature to a higher level for the oxidation phase. Thus, in the preferred embodiment, the temperature of the gas stream entering the reduction phase ranges from 500° F. to 700° F. with the oxidation phase temperatures ranging from 1400° F. to 1500° F. These temperatures are considered representative of one embodiment of the invention, as the temperature ranges may vary according to length of the catalyst beds as well as the type and quantity of catalyst used. Any modifications of the temperature ranges are considered within the scope of ordinary skill in the art and are not considered undue experimentation.

The chamber 12 is encased in any suitable insulation means, which is adapted for the environment that system 1 is used for. These environments may include, but are not limited to, spacecraft, aircraft, submarines, clean room environments, or other air handling systems which employ air purification prior to exhaustion into a closed loop system or release into the atmosphere.

Choices for the oxidation catalyst include platinum-based systems. Choices for the reduction catalysts include using titanium and/or vanadium systems. It should be noted that these are representative only of classes of catalytic compounds and any equivalents may be substituted without departing from the scope of the invention.

As shown in FIG. 3, the heating portion 20 of the chamber may also be isolated as a separate pre-reaction step, stated differently the heating source may be located upstream from the reaction chamber. In this embodiment, the air stream is heated to a temperature sufficient to perform both the oxidation and reduction portions 21 and 22 of the reaction prior to any catalyst contact.

Figure 4:
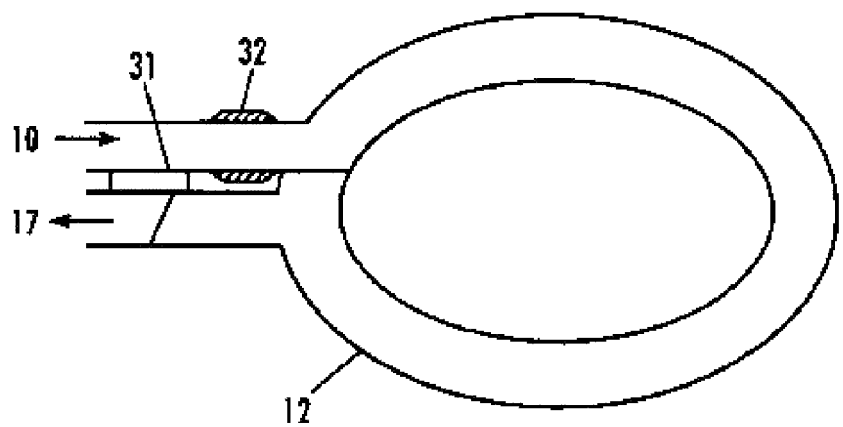
FIG. 4 is a diagrammatic representation of a third embodiment of the novel reaction chamber.

In a further embodiment, as shown in FIG. 4, the heating phase includes a heat exchanger 31 for reuse of the heat added to the gas stream prior to catalyst contact. Even though the overall system is exothermic in nature, the heat generated by the catalytic reactions is not considered to be large enough to be a factor in any use of the output energy of the system. In this embodiment, the heat energy transferred by the heat exchanger is primarily that which is a product of the heating source 32. As shown, this embodiment is a folded loop design but any other geometry is considered as equivalent, these being available to those of ordinary skill in the art.

Figure 5:
FIG. 5 is a diagrammatic representation of a novel heater means.
Figure 6:
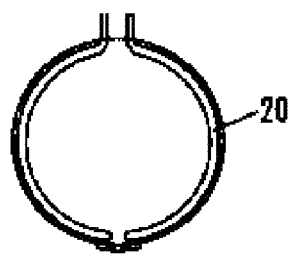
FIG. 6 is a diagrammatic representation of a second embodiment of the novel heater means.
Figure 7:
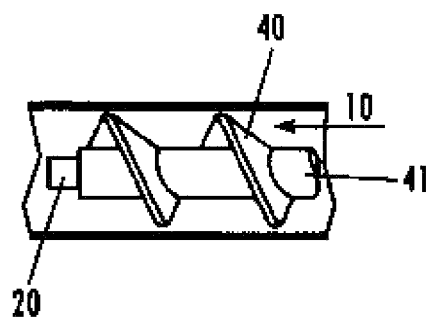
FIG. 7 is a side elevational view of the novel catalytic reaction chamber.
Figure 8:
FIG. 8 is a perspective view of the novel catalytic components.
Figure 9:
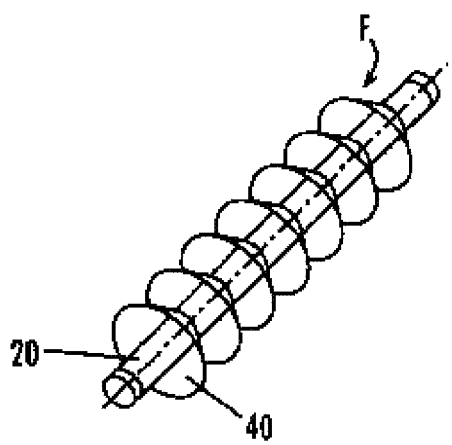
FIG. 9 is a perspective view of the novel catalyst support system.

As well as a linear geometry, the heater may be a tubular or wrap-around shape 20, in which the heating source is wrapped around the catalyst tubing 13, as shown in FIG. 5; or generally circular in shape as depicted in FIG. 6, where the heating source 20 is in a loop shape around the catalyst. Again, these are exemplary geometries and others are considered within the scope of the invention. The catalyst beds themselves may differ in design as well. A few of the possibilities are shown in FIGS. 7-9. These figures show a variety of catalyst holders and flow control baffles for maximizing the gas stream contact with the catalytic material. These are considered representative only and modifications of these systems are well known in the art and available to ordinary skilled artisan.

For example, FIG. 7 shows the catalyst portion 40 attached in plate form on a catalyst holder 41 which further contains the heating source 20. Likewise, FIG. 8 shows the catalyst portion 40 extending out from the heating source 20 in a "turbine-like" array. Finally, FIG. 9 shows the catalyst portion 40 being positioned about the heating source 20 in a conical formation.

Figure 10:
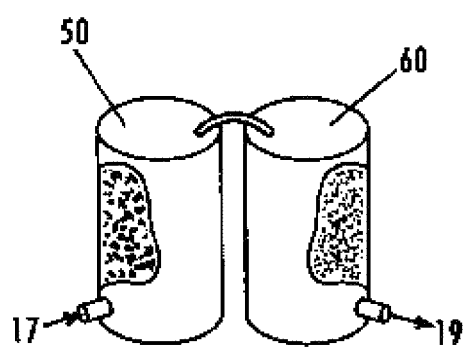
FIG. 10 is a perspective view of the novel post-reaction carbon dioxide conversion system.
Figure 11:
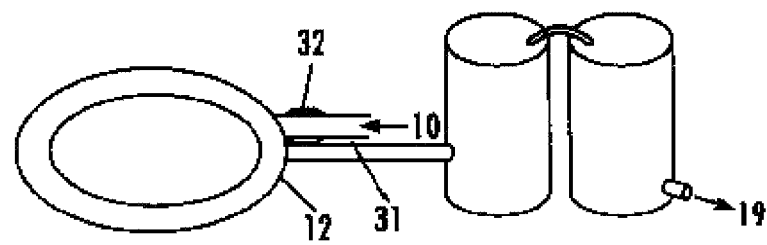
FIG. 11 is diagrammatic representation of the post-reaction carbon dioxide conversion system and a heat exchanger.

Again referring to FIG. 1, the exiting air stream 17 from the reaction chamber 12, is then conveyed to a downstream gas flow stream converter 18, which converts the carbon dioxide to oxygen. Converter 18 may contain any suitable chemical compound, such as CaO, charcoal, or Na or any other known to those of ordinary skill in the art for the chemical conversion. In another embodiment, the system may have a pre-treatment zone, as shown in FIG. 10, for evaporation of the water vapor contained in the exit stream 17 by the de-moisture tower 50 as well as a heat exchanger for removal of the excess heat from the system prior to carbon dioxide conversion as depicted in FIG. 11 by carbon dioxide converter tower 60.

As shown in FIG. 1, the heated air stream 19 may then be conveyed to any system that requires heat for operation. Once the heated air stream has been bled off, that heated air can be used by other systems outside the purification system described herein. These systems may include, but are not limited to, cooking, battery charging, power supplies and heating functions. In the case of the embodiment of FIG. 10, the heat obtained from the system is also available for use in similar applications. The water vapor obtained from the system is also available for down line functions. In addition, the system may include a two-stage cooling system whereby heat exchange and conveyance occur both before and after the carbon dioxide conversion.

Figure 12:
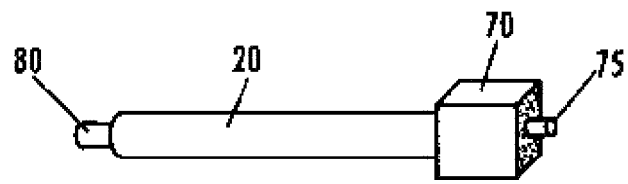
FIG. 12 is a perspective view of an alternative embodiment of the novel heating means.

The air purification system of the instant invention also may contain a control module as shown in FIG. 12. The temperature may be regulated by a control circuit 75 and have a sensing system 80 for sensing variations contained therein. In addition, a control mechanism 70 which can provide for regulation from a remote location, such as a control room, may also be supplied for operation of the system. Such control systems are considered available to those of ordinary skill in the art and do not require further explanation.

The system of the instant invention is capable of being packaged in a single unitary design, especially when the heat exchange portions are used to preheat the gas stream. However, it is also within the scope of the invention that the components may also be installed and maintained separately and be incorporated into an aircraft or submarine as a whole. This type of embodiment is particularly applicable when the use of the heat generated in the system is used to meet the demands of other operating systems. The system is so constructed in both instances so that when the catalyst is spent, the modules may be easily removed and replaced with the catalyst either being discarded or regenerated.

The system of the instant invention has the advantage that the air purified by the system is considered free of all volatile organic contaminants and may be recirculated in passenger cabins. In addition, oxygen is generated into the new air supply by the carbon dioxide converter and this makes the requirement of outside sources of oxygen less stringent. Furthermore, the heat used in the system is either reused within the system or is applied to other functions and is therefore not lost resulting in a more energy efficient air purification system. The instant system is easy to maintain since the components are modules in nature and are constructed for easy replacement.

Modification and variation can be made to the disclosed embodiments of the instant invention without departing from the scope of the invention as described. Those skilled in the art will appreciate that the applications of the present invention herein are varied, and that the invention is described in the preferred embodiment. Accordingly, additions and modifications can be made without departing from the principles of the invention. Particularly with respect to the claims it should be understood that changes might be made without departing from the essence of this invention. In this regard it is intended that such changes would still fall within the scope of the present invention.

Therefore, this invention is not limited to the particular embodiments disclosed, but is intended to cover modifications within the spirit and scope of the present invention as defined in the appended claims.

What is claimed is:

1. A catalytic air purification system, comprising:
    a conduit means adapted for air flow there through, said conduit means defining a path of travel for air flowing there through;
    said conduit means having an inlet and an outlet, said outlet being downstream from said inlet;
    a first reaction chamber including a reduction catalyst disposed in said conduit means downstream of said inlet;
    a second reaction chamber including an oxidation catalyst disposed in said conduit means downstream of said first reaction chamber in contiguous relation to said first reaction chamber;
    heating means disposed in said conduit means upstream of said first and second reaction chambers for heating said first and second reaction chambers, said heating means being in direct heat transfer relation to said first and second reaction chambers; and
    pumping means for pumping air through said conduit means from said inlet to said outlet.

2. The system of claim 1, further comprising:
    a filter means disposed downstream of said inlet and upstream of said first reaction chamber.

3. The system of claim 1, further comprising:
    said filter means including means for removing solid particulate matter and liquid vapors.

4. The system of claim 1, further comprising:
    a gas flow stream converter disposed downstream of said second reaction chamber.

5. The system of claim 4, further comprising:
    said gas flow stream converter including converter means for converting carbon dioxide to oxygen.

6. The system of claim 5, further comprising:
    said gas flow stream converter including means for evaporation of water vapor disposed downstream of said second reaction chamber and upstream of said converter means.

7. The system of claim 6, further comprising:
    said gas flow stream converter including a heat exchanger disposed downstream of said second reaction chamber and upstream of said converter means, said heat exchanger adapted to remove heat from said air before said air flows to said converter means.

8. The system of claim 1, further comprising:
said first reaction chamber including titanium as a component thereof 9. The system of claim 1, further comprising:
said first reaction chamber including vanadium as a component thereof.

10. The system of claim 1, further comprising:
said second reaction chamber including platinum as a component thereof.

11. The system of claim 1, further comprising:
a volatile organic carbon analyzer disposed downstream of said inlet and upstream of said first reaction chamber for monitoring the gas flow stream for quality of air purification.

12. The system of claim 1, further comprising:
a volatile organic carbon analyzer disposed downstream of said second reaction chamber and upstream of said outlet for monitoring the gas flow stream for quality of air purification.

\* \* \* \* \*